(12) United States Patent
Sternhamn

(10) Patent No.: US 7,380,509 B1
(45) Date of Patent: Jun. 3, 2008

(54) PALLET AND METHOD OF MANUFACTURING THE PALLET

(76) Inventor: Nils-Åke Sternhamn, Leksbergsvägen 41, SE-542 44, Mariestad (SE)

( * ) Notice: Subject to any disclaimer, the term of this patent is extended or adjusted under 35 U.S.C. 154(b) by 0 days.

(21) Appl. No.: 09/700,121

(22) PCT Filed: May 11, 1999

(86) PCT No.: PCT/SE99/00792

§ 371 (c)(1),
(2), (4) Date: Nov. 9, 2000

(87) PCT Pub. No.: WO99/61330

PCT Pub. Date: Dec. 2, 1999

(30) Foreign Application Priority Data

May 14, 1998 (SE) .................... 9801709

(51) Int. Cl.
*B65D 19/00* (2006.01)
(52) U.S. Cl. .................... 108/51.3; 108/51.11
(58) Field of Classification Search .............. 108/51.3, 108/51.11, 56.3
See application file for complete search history.

(56) References Cited

U.S. PATENT DOCUMENTS 2,888,221 A * 5/1959 Connelly .................... 108/51.3
4,487,136 A * 12/1984 Beckway .................... 108/51.3
4,850,284 A * 7/1989 DeGroot et al. .......... 108/56.3

FOREIGN PATENT DOCUMENTS

| DE | 3432072 | 6/1986 |
| EP | 0494540 | 7/1992 |
| EP | 0690002 | 1/1996 |
| GB | 1 454 173 | 10/1976 |
| GB | 2 271 336 | 4/1994 |

* cited by examiner

*Primary Examiner*—José V Chen
(74) *Attorney, Agent, or Firm*—Sughrue Mion, PLLC

(57) ABSTRACT

A pallet arrangement intended for one-time use only, includes an upper deck plate, bottom runners and spacer elements located between the deck plate and the bottom runners and functioning as pallet feet. The spacer elements include supportive tubular elements which are fixed in position relative to the deck plate against locking flaps that are folded down around circular fold lines punched in the deck plate. In turn, the locking flaps are firmly clamped between the tubular spacer elements and locking tubes that are inserted from above through openings that were formed in the deck plate by folding down the locking flaps. A method of manufacturing the pallet is also provided.

7 Claims, 3 Drawing Sheets

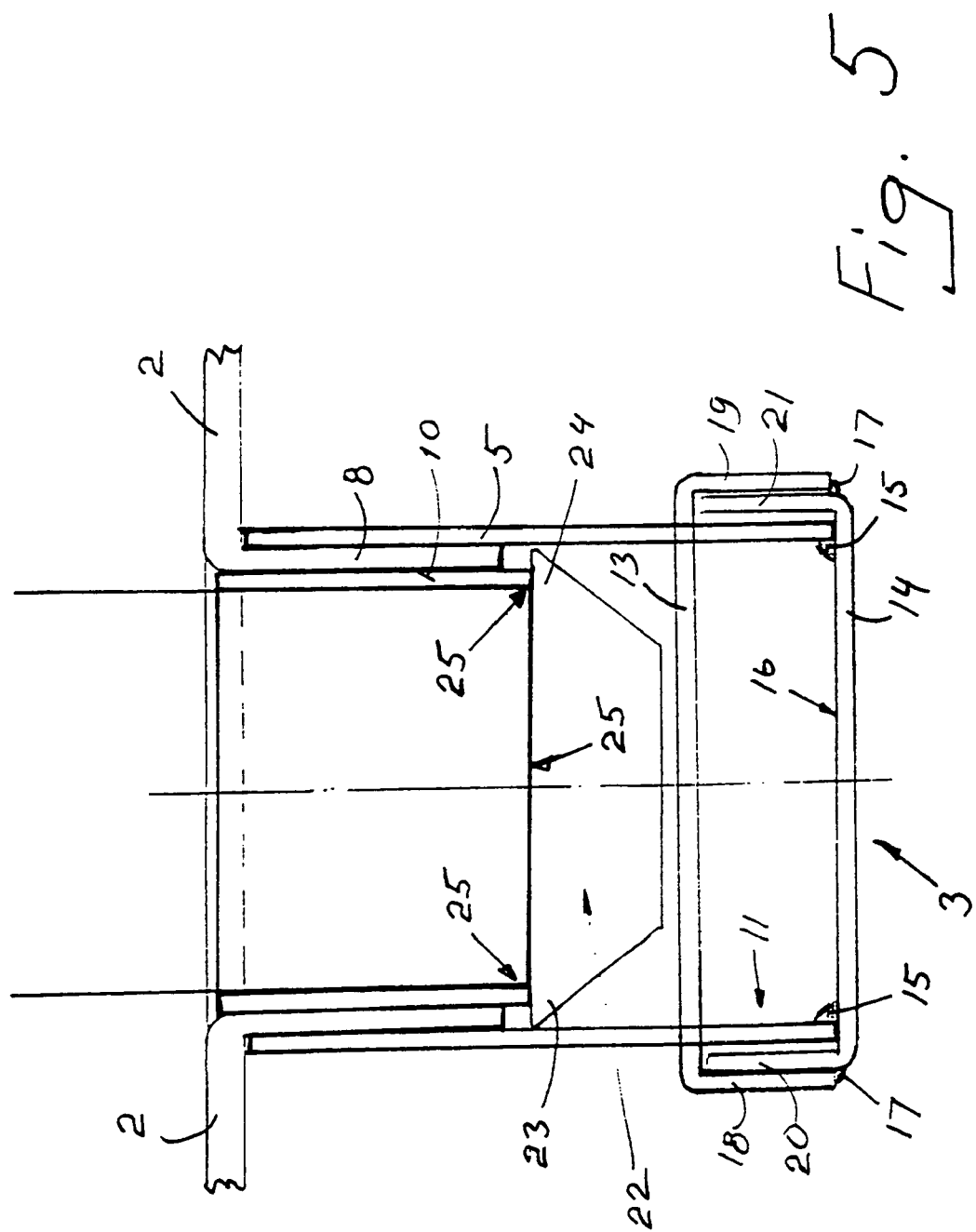

PALLET AND METHOD OF MANUFACTURING THE PALLET

The present invention relates to a pallet arrangement, and then preferably to a pallet that is intended for one-time use only and made of recoverable paperboard material, said pallet comprising an upper deck plate, bottom runners and spacer elements located between the deck plate and the bottom runners and functioning as pallet feet. The invention also relates to a method of manufacturing such pallets.

BACKGROUND OF THE INVENTION

Several different types of recoverable paperboard pallets are at present commercially available. All of these pallets have a good bearing capacity and quality, to a greater or lesser extent. Because of increasing demands with respect to the recovery of materials, there will be needed within the near future a pallet or load carrier that is both recoverable and possesses the capacities of a wooden pallet. These requirements include four-way handling, i.e. a facility which enables the pallet to be handled with a lifting implement from four different directions. Another requirement is that the pallet shall be able to withstand outdoor climates for long periods of time and capable of managing a load of ten tonne. Finally, it shall be possible to drive over the bottom runners of the pallet with a pallet trolley, for instance from one long side. It is seldom that the disposable pallets at present available commercially fulfill these conditions.

SUMMARY OF THE INVENTION

The object of the present invention is to provide an arrangement with which the drawbacks encumbered by earlier known pallet constructions of similar types are eliminated while fulfilling all four of, the aforesaid conditions. Another object of the invention is to provide a method of manufacturing such pallets. The characteristic features of the present invention are set forth in the following claims. The inventive pallet effectively fulfils its intended functions and can be produced readily and inexpensively. The inventive pallet may be produced from a recoverable paper material, said deck plate being made of thick corrugated fiberboard, while remaining pallet components, such as spacer elements and bottom runners, are made of solid paperboard. Although the inventive pallet is primarily intended for one-time use only, its robust construction will enable it to be used more than once in some cases. The pallet can also withstand a great deal of "punishment". Despite the toughness of the pallet and its high load-bearing capacity, which can be likened to the load-bearing capacity of a standard wooden pallet, the inventive pallet weighs only about 3.5 kg in comparison with a wooden pallet, which weighs about 14 kg. This is an important advantage, particularly with respect to air transportation where the weight of the pallets used is highly significant from an economic viewpoint. The structural components of the pallet are locked and fixed in position very effectively, among other things by virtue of the special fixation of the spacer elements against the underside of the deck plate, these spacer elements functioning as pallet feet.

The special design of the spacer elements also enables packaging to be easily secured in position on the load-carrying deck, by virtue of the fact that said elements include internally a locking edge for locking coaction with flap formations and locking hooks or barbs that project out from the packaging material for locking coaction with the spacer elements.

BRIEF DESCRIPTION OF THE DRAWINGS

The invention will now be described in more detail with reference to a preferred embodiment thereof and also with reference to the accompanying drawings, in which

FIG. 5 corresponds to the cross-sectional view of the spacer element shown in FIG. 4, and shows a locking flap extending down from packaging placed on the deck and extending through the spacer element so as to lock said element.

DETAILED DESCRIPTION OF THE INVENTION

Figure 1:
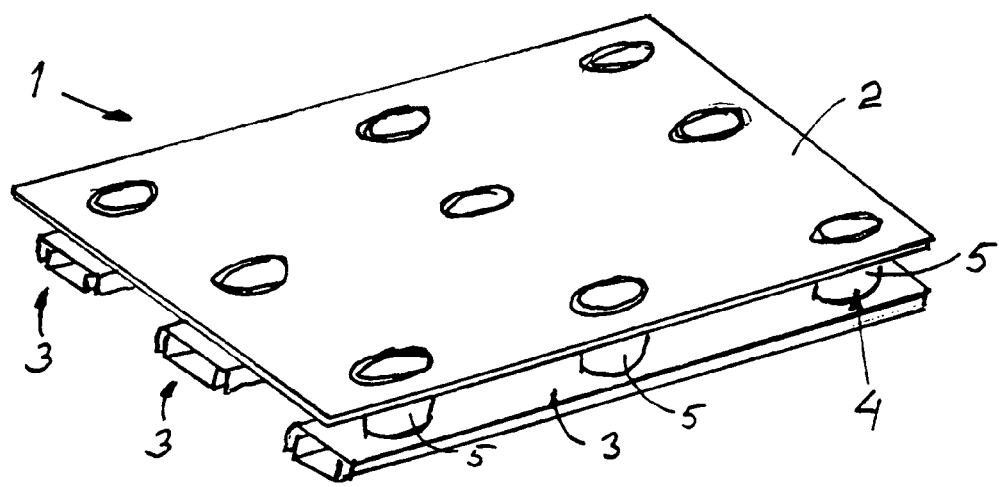
FIG. 1 illustrates schematically and in perspective a preferred embodiment of an inventive pallet.
Figure 2:
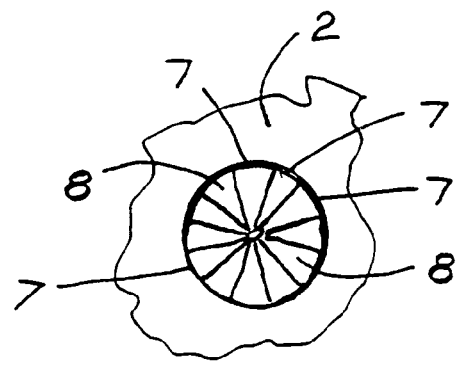
FIG. 2 is a partial, schematic view from above of one of the nine apertures punched from the deck plate by means of punch knives and having an outer circular fold line prior to folding down the formed flaps into abutment with an underlying spacer element, and subsequently pressing-in a locking tube which presses against the flaps and the outer surface of the tubular spacer element.
Figure 3:
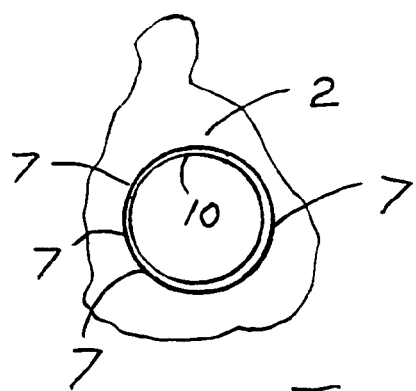
FIG. 3 is a partial, schematic perspective view from above which illustrates the stage at which the inner locking tube has been pressed down into a spacer element so as to lock said element against the locking flaps which are now pressed together.
Figure 4:
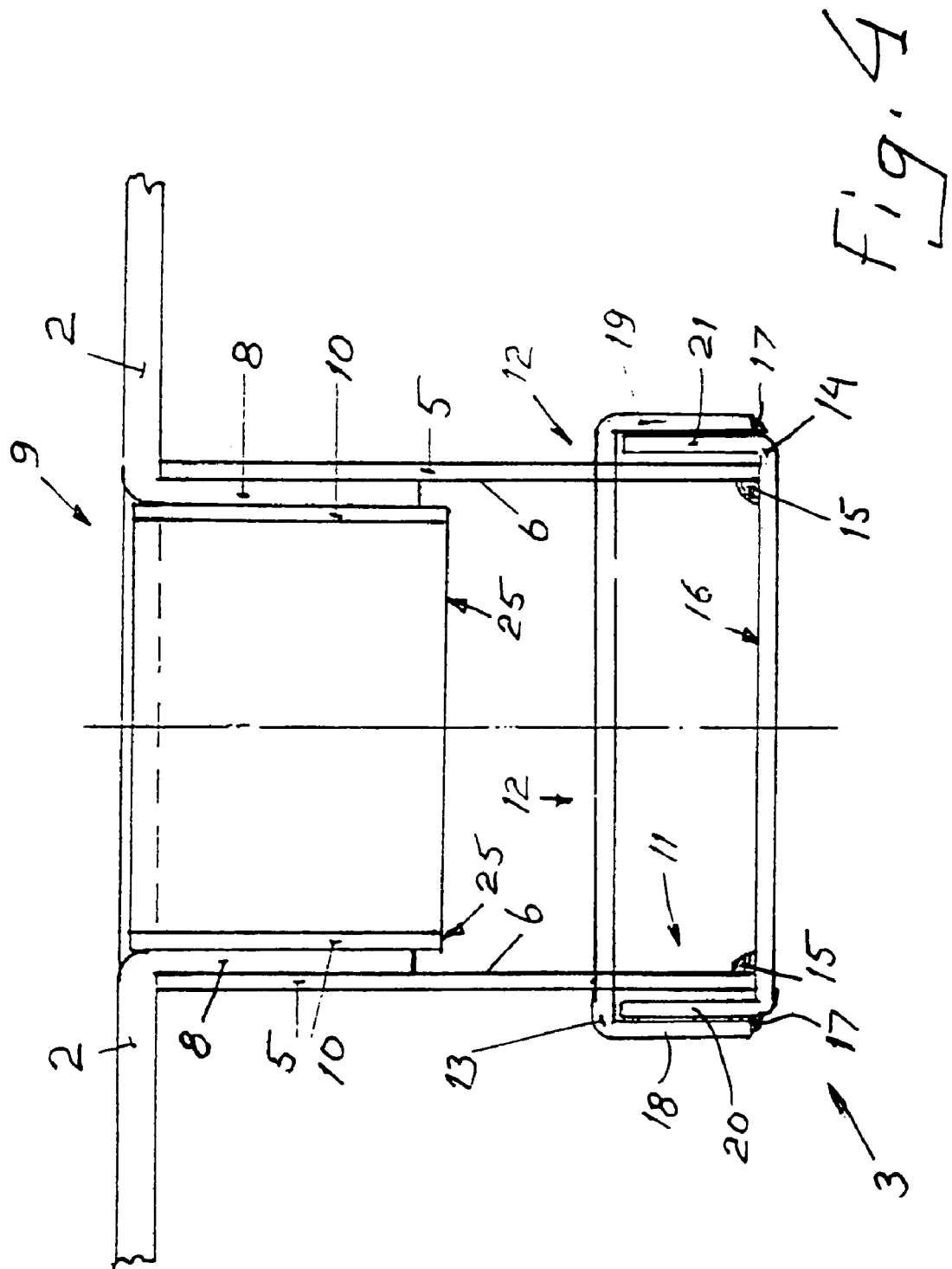
FIG. 4 is a partial, schematic cross-sectional view of a fitted spacer element, taken on the line IV-IV in FIG. 1, said view illustrating how locking is achieved with a spacer element against the underside of the deck by means of locking flaps folded down therefrom and with the aid of the inner locking tube.

As will be evident from the preferred embodiment of the inventive pallet 1 illustrated schematically and in perspective in FIG. 1, the pallet comprises an upper deck plate 2, bottom runners 3, and spacer elements 4 which are located between the deck plate 2 and the bottom runners 3 and which function as pallet feet. The deck plate 2 of the illustrated embodiment is comprised of corrugated paperboard having a thickness of about 7 mm, while the bottom runners 3 and the spacer elements 4 are comprised of solid board having a thickness of about 4 mm. This provides a pallet which is recoverable and has the facilities afforded by a wooden pallet.

The spacer elements 4 of the illustrated embodiment comprise supportive tubular elements 5 which are fixed positionally to the deck plate 2 through the medium of the inner cylindrical surface 6 of tube 5, against sector-shaped locking flaps 8 punched out from the deck plate and folded out around circular folding lines 7. These locking flaps 8 are intended to hold the tubular spacer elements 5 in place by virtue of being firmly clamped between the inner cylindrical surface 6 of the tubular spacer elements 5 and respective locking tubes 10 which can be pressed into the spacer elements 4 from above and in through the openings 9 that are formed in the deck plate when folding down the locking flaps 8. The free ends 11 of the tubular spacer elements have glued thereto bottom runners 3 formed by top and bottom U-shaped pallet runners 13, 14 which are joined together with their respective legs 18-21 facing towards each other. The top, U-shaped pallet runners 13 have punched therein holes 12 for receiving the tubular spacer elements 5, these elements being affixed to the inner bottom surface 16 of the U-shaped pallet runners 14 by means of an adhesive 15. The free part of the legs 18, 19 of the top U-shaped pallet runners 13 is affixed positionally to the legs 20, 21 of the bottom U-shaped pallet runners 14 by means of an adhesive 17. As a result of the pressure exerted by the inner locking tubes 10 outwardly against the locking flaps, the tubular spacer elements 5 positioned beneath the deck plate 2 are held with a firmness sufficient to obviate the need of glue or some other adhesive for this purpose. The locking flaps will preferably have a length that enables them to be clamped firmly between the inner barrel surface 6 of the tubular spacer elements 5 and the locking tubes pressed into said tubular spacer elements. The length of the locking flaps 8 will preferably be slightly smaller than half the inner diameter of the tubular spacer elements 5 or will correspond to half said diameter. The length of the locking tube 10 may vary, although its diameter will be slightly smaller than the inner diameter of the tubular spacer elements 5.

In the case of the illustrated embodiment, respective locking flaps 8 are sectorial in shape with respective sector bases forming the circular fold lines 7.

The packaging placed on the pallet can be affixed to the pallet deck 2 with the aid of flap formations 22 which project out from the packaging and which have on their forward, free parts latching hooks or barbs 23, 24 that can be hooked onto a bottom edge 25 of a respective locking tube 10.

An inventive pallet is manufactured in the following manner.

Nine apertures are punched in the upper deck plate 2 with the aid of punching knives, in sectorial segments that have an outer, circular weakening in the form of respective fold lines 7, such as to form a plurality of locking flaps 8 which can be folded down along the fold lines 7. Spacer elements 4 in the form of the supportive tubular spacer elements 5 are then placed beneath the deck plate 2 so that the outwardly projecting locking flaps 8 will lie with respective spacer elements. locking tubes 10 are then inserted into the openings 9 formed when punching out the locking flaps 8, such as to press the locking flaps against the inner barrel surface 6 of the tubular spacer elements 5 whilst, at the same time, pressing down the locking tubes 10 with the locking flaps 8 firmly clamped between the tubular spacer elements 5 and the locking tubes 10. The runners 3, consisting of mutually fastened top and bottom U-shaped pallet runners 13, 14, are then glued to the free ends 11 of the tubular spacer elements 5 by means of an adhesive 15 in conjunction with inserting the ends 11 into the holes 12 punched in the top U-shaped pallet runner 13 of the bottom runners 3.

The invention claimed is:

1. A pallet arrangement intended for one-time use only, comprising an upper deck plate (2), bottom runners (3) and spacer elements (4) located between the upper deck plate (2) and the bottom runners (3) and functioning as pallet feet, said spacer elements (4) comprising tubular spacer elements (5) and being fixed positionally in relation to the upper deck plate (2) against locking flaps (8) folded out from circular fold lines (7) punched in said upper deck plate (2), through an inner cylindrical surface (6) of a corresponding one of said tubular spacer elements, said locking flaps (8) being in turn, clamped firmly between the tubular spacer elements (5) and locking tubes (10) pressed from above into openings (9) formed in the upper deck plate (2) by punching-out and folding down said locking flaps (8), wherein:

the bottom runners (3) are comprised of upper and lower U-shaped pallet runners (13, 14) which are joined together with their respective legs (18-21) facing towards each other at the same time as legs (18, 19) of the upper pallet runners extend over and are affixed to legs (20, 21) of the lower pallet runners; and the upper pallet runners (13) include apertures (12) which engagingly receive the tubular spacer elements (5), lower free ends (11) of which are affixed to an inner bottom surface (16) of the lower pallet runners (14) with the aid of an adhesive (15).

2. The pallet arrangement according to claim 1, wherein the locking flaps (8) have a length which enables the locking flaps to be clamped firmly between the inner cylindrical surface (6) of the tubular spacer elements (5) and the locking tubes (10) pressed into said tubular spacer elements (5).

3. The pallet arrangement according to claim 2, wherein a length of the locking flaps (8) is slightly smaller than half an inner diameter of the tubular spacer elements (5) or corresponds to half of said diameter; and wherein the diameter of said locking tubes is slightly smaller than the inner diameter of the tubular spacer elements (5).

4. The pallet arrangement according to claim 1, wherein the locking flaps (8) are sectorial in shape with a base of respective sectors forming the circular fold lines (7).

5. The pallet arrangement according to claim 1, wherein bottom edges (25) of respective locking tubes (10) are operative to coact lockingly with flap formations (22) which project out from a packaging material placed on the pallet (1) and which are provided with locking hooks or barbs (23, 24) that engage with the bottom edges (25) of respective locking tubes (10), such as to hold the packaging material firmly in position on said pallet.

6. The pallet arrangement according to claim 1, wherein the upper deck plate (2) is comprised of corrugated fiberboard that has a thickness of about 7 mm; and wherein the tubular spacer elements (5), the locking tubes (10) and the bottom runners (3) are comprised of solid board.

7. A method of manufacturing a pallet intended for one-time use only, comprising an upper deck plate (2), bottom runners (3), and spacer elements (4) located between the upper deck plate (2) and the bottom runners and functioning as pallet feet, wherein, before mounting of the spacer elements (4) having the form of tubular spacer elements (5) below the upper deck plate (2), the method comprising:

punching in the upper deck plate (2), with the aid of punch knives, apertures or openings (9) that present sectorial locking flaps (8) having respective outer, circumferentially extending weakenings in the form of fold lines (7);

folding the locking flaps (8) down along said fold lines (7) into abutment with an inner cylindrical surface (6) of respective tubular spacer elements (5);

fixing said locking flaps in abutment with said inner cylindrical surface (6) with the aid of locking tubes (10) that are pressed down through the openings (9) punched in said upper deck plate, said locking flaps (8) affixing the position of respective tubular spacer elements (5) with the aid of said locking tubes (10);

forming the bottom runners (3) of upper and lower U-shaped pallet runners (13, 14) by joining together respective pallet runner legs (18-21) facing towards each other such that the legs (18, 19) of the upper pallet runners extend over and are affixed to the legs (20, 21) of the lower pallet runners;

forming apertures (12) in the upper pallet runners (13);

inserting free ends (11) of the tubular spacer elements (5) into the apertures (12); and affixing the free ends (11) to an inner bottom surface (16) of the lower runners (14) with the aid of an adhesive (15).

* * * * *